United States Patent [19]

Drone

[11] 3,767,014
[45] Oct. 23, 1973

[54] FILTER SYSTEM FOR CRAWLER TRACTOR FINAL DRIVES

[75] Inventor: Gary A. Drone, Springfield, Ill.

[73] Assignee: Allis-Chalmers Corporation, Milwaukee, Wis.

[22] Filed: May 26, 1972

[21] Appl. No.: 257,302

[52] U.S. Cl. .............................. 184/6.12, 184/6.24
[51] Int. Cl. ...................... F01m 9/06, F16n 39/06
[58] Field of Search ................. 184/6.24, 6.12, 6.28; 180/6.2; 123/196 A

[56] References Cited
UNITED STATES PATENTS
| | | | |
|---|---|---|---|
| 1,858,533 | 5/1932 | White | 184/6.12 |
| 3,170,534 | 2/1965 | Kelley et al. | 184/6.12 |
| 2,979,160 | 11/1956 | Haas | 184/6.24 |
| 2,792,078 | 5/1957 | Lucia | 184/6.24 |

Primary Examiner—Manuel A. Antonakas
Assistant Examiner—Allan Russell Burke
Attorney—Charles L. Schwab et al.

[57] ABSTRACT

The lubricating fluid from one of a pair of final drive housings is routed through a filter during forward operation of the crawler tractor and the lubricating fluid from the other final drive housing is routed through the same filter during reverse operation of the crawler tractor. A unique automatic flow control valve and a reversible pump are so connected and arranged with the fluid filter and final drive housings so as to permit a single pump and a single filter to be employed in filtering the lubricating fluid in a pair of final drive housings without substantial interchange of lubricating fluid therebetween.

6 Claims, 2 Drawing Figures

FILTER SYSTEM FOR CRAWLER TRACTOR FINAL DRIVES

BACKGROUND OF THE INVENTION

Heretofore others have provided means for filtering lubricating fluid in isolated transmission housings, however, separate pumps and filters were employed to accomplish the filtering operation. The previously suggested systems are not only expensive but also require considerable space.

BRIEF DESCRIPTION OF THE INVENTION

A single pump and a single filter are employed to filter the lubricating fluid in a pair of relatively isolated final drive housings without intermixing the lubricating fluid in the final drive housings. This is achieved through use of a reversible driven pump, a pressure operated flow control valve and appropriate check valves. The reversibly driven pump is connected to the output side of a change-speed transmission whereby when the tractor is driven forwardly it serves to circulate the fluid in one final drive housing through the filter and when the vehicle is operated in reverse the pump will circulate the lubricating fluid in the other final drive housing through the filter.

DETAILED DESCRIPTION OF THE INVENTION

Figure 1:
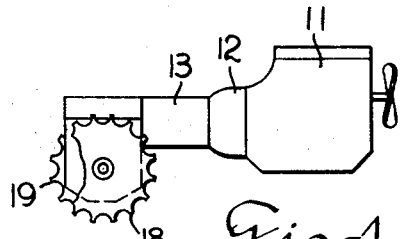
FIG. 1 is a side view of part of a crawler tractor of the type in which the present invention may be used.

Referring to FIG. 1, the crawler tractor in which the present invention is incorporated will normally include an engine 11, a clutch or torque converter housing 12, a change-speed transmission 13, a steering clutch and bevel gear housing 14, and a pair of final drive housings 16, 17. The power from the engine is transmitted to a pair of endless track belts (not shown) by a pair of sprockets 18, 19.

Figure 2:
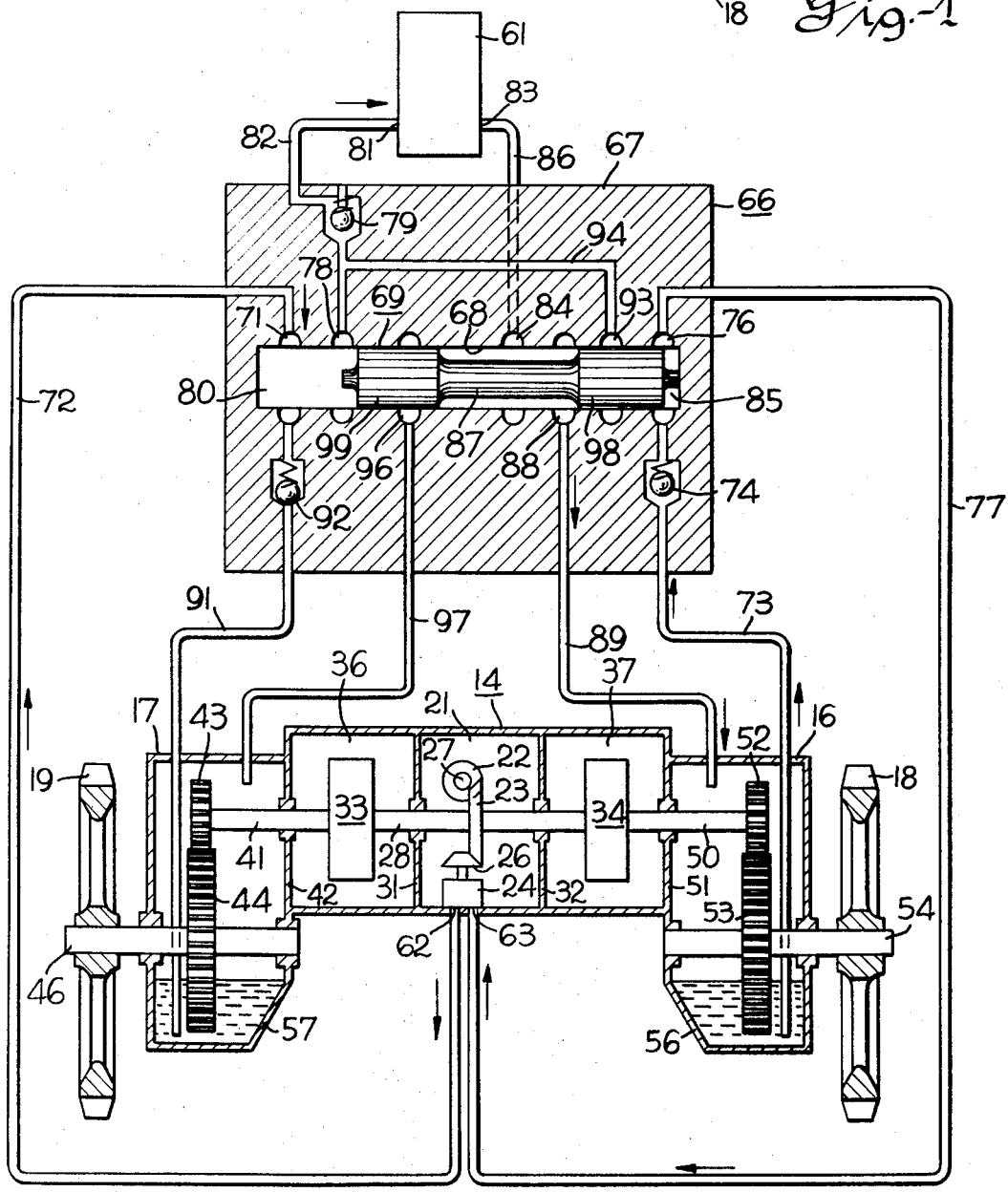
FIG. 2 is a schematic illustration of the present invention.

Referring to FIG. 2, the bevel gear compartment 21 of housing 14 contains a pair of meshing bevel gears 22, 23 and a reversible pump 24 driven by a bevel gear 26 which meshes with bevel gear 23. Bevel gear 22 is connected to the transmission output shaft 27 and bevel gear 23 is connected to a transverse drive shaft 28 which extends through the bevel gear compartment side walls 31, 32 and connects to the input sides of steering clutches 33, 34 disposed in the steering clutch compartments 36, 37 of housing 14. The output side of steering clutch 33 is connected to a shaft 41 which extends through a wall 42 of compartment 36 and has a drive pinion 43 secured for rotation therewith at its outer end. The drive pinion 43 meshes with a final drive gear 44 nonrotatably secured to a final drive shaft 46 carried by suitable bearings in opposite lateral walls of the final drive housing 17. The drive shaft 46 has its outer end nonrotatably secured to the final drive sprocket 19. Similarly, an output shaft 50 of steering clutch 34 passes through wall 51 and carries a drive pinion 52 which meshes with a final drive gear 53 secured to a final drive shaft 54 carried in laterally opposite walls of the final drive housing 16. The drive sprocket 18 is secured at the outer end of the shaft for rotation therewith. The final drive housings 16, 17 are isolated from one another insofar as concerns the lubricating fluid contained therein. The level of fluid in their bottom reservoir portions 56, 57 may be as illustrated or at any suitable level to properly effect the desired lubrication of components within the final drive housings 16, 17.

The present invention provides means for alternately circulating the lubricating fluid contained in the final drive housings 16, 17 through a single filter 61. The means for accomplishing this objective include the reversible driven pump 24 which delivers fluid to its port 62 when the vehicle is operated forwardly and draws fluid into its other port 63 during such operation. When the vehicle travels in reverse the fluid is drawn in through port 62 and is delivered through port 63. Special fluid flow control means are provided to route the fluid from one final drive housing through the filter and then return it to its source when the vehicle is operated in one direction and to draw the fluid from the other final drive housing and pass it through the filter and then back to such other final drive housing when the vehicle is operated in the other direction, this being accomplished in conjunction with the reversible pump 24.

The fluid flow control means includes a valve means 66 having a valve housing 67 with a bore 68 in which a fluid pressure operated flow control element in the form of spool 69 is disposed for shiftable movement between first and second position at opposite ends of the bore 68. In the first position as illustrated in FIG. 2, the tractor is operating in a forward direction and the pump 24 is delivering fluid from its port 62 to an input port 71 by way of fluid passage means in the form of conduit 72. The pump 24, in the illustrated position of valve spool 69, draws fluid from the reservoir portion 56 of the final drive housing 16 by way of a fluid conduit 73, a check valve 74 in housing 67, a port 76 and a conduit 77 interconnected between valve port 76 and port 63 of pump 24. The fluid pressure delivered to port 71 enters pressure chamber 80 and forces the spool 69 of the control valve means 66 to the right, as illustrated, thus permitting flow of lubricating fluid to filter supply port 78, by a check valve 79 and to a filter input port 81 by way of conduit 82. Fluid passing through the filter 61 exits at filter output port 83 and passes to a filter return port 84 through a conduit 86. A recessed portion 87 of spool 69 permits fluid to flow from port 84 to a return port 88 and the fluid passes from such port to the final drive housing 16, from whence it originated, by way of fluid return conduit 89.

When the tractor operates in reverse, the pump 24 is rotated by gears 23, 26 in a reverse direction whereby lubricating fluid is drawn from the bottom or reservoir portion of final drive housing 17 by way of conduit 91, check valve 92, port 71, conduit 72 and pump port 62. The pump 24 delivers the lubricating oil through its port 63 thence to the filter 61 by way of conduit 77, port 76, pressure chamber 85, port 93, passage 94, check valve 79, conduit 82 and port 81. The oil, after being filtered, passes from the filter 61 by its output port 83 and is returned to the final drive housing 17, from whence it came, by way of conduit 86, port 84, bore 68, a return port 96 and a conduit 97. During the reverse direction operation, check valve 74 remains closed and valve port 88 is blocked by land 98 of valve spool 69. Thus, oil in the final drive housing 16 is isolated during circulation of the oil in the final drive housing 17 through the filter 61. Similarly, during forward operation of the tractor, land 99 blocks port 96 and check valve 92 is closed whereby the oil in the final drive housing 17 remains isolated during filtering of the oil in the final drive housing 16. Accordingly, the level of fluid in each of the final drive housings remains as originally provided and there is only that interchange or mixing of oil as results from oil in the conduits, passages and filter at the time of automatic switching from one final drive housing to the other on changing tractor direction.

The present invention economically provides an effective means for filtering the lubricating oil in a pair of isolated transmission or final drive housings of a crawler tractor utilizing a single pump and a single filter. The pump 24 and the unique automatic operating fluid flow control means provide the means for alternately circulating the oil in the final drive housings through the single filter. Although a crawler tractor may operate in forward more than in reverse, sufficient filtering will be achieved during reverse operation to adequately filter the oil in the final drive housing. Although check valve 79 is incorporated in the valve housing 67 it may be incorporated into the filter 61 inasmuch as its purpose is to prevent any accidental reverse flow through the filter. Since reverse flow through the filter could only occur through a malfunction of the valve spool 69 and one of the check valves 74,92, such malfunctioning is not likely to occur; and, thus, it is possible to have an operative system without check valve 79.

The embodiments of the invention in which an exclusive property or privilege is claimed are defined as follows:

1. In a tractor having a pair of isolated transmission housings each of which contains lubricating fluid during normal tractor operation, the combination comprising:

a fluid filter,
fluid pumping means and
fluid flow control means operatively associated with said fluid pumping means and filter, said flow control means having a first adjusted condition in which lubricating fluid from only one of said housings is routed through said filter and returned to said one housing and having a second adjusted condition in which lubricating fluid from the other of said housings is routed through said filter and returned to said other housing.

2. The invention of claim 1 wherein said pumping means is a reversible pump.

3. The invention of claim 2 wherein said pump is driven in opposite directions when said tractor is operated in forward and reverse directions, respectively.

4. The invention of claim 3 wherein said pump has a pair of ports connected to said fluid flow control means and said fluid flow control means includes a pair of conduits connected to said housings, respectively, for withdrawing fluid from said housings and a check valve operatively associated with each of said conduits permitting flow of lubricating fluid in said conduits from said housings and preventing reverse flow.

5. The invention of claim 4 wherein said flow control means includes an automatic flow control valve having a shiftable flow control element.

6. The invention of claim 5 wherein said flow control element is a valve spool and said control valve includes a housing having a bore in which said spool is reciprocably disposed between first and second axially shifted positions and having pressure chambers at each of the opposite ends of said bore, and wherein said ports of said pump are in fluid communication with said pressure chambers, respectively.

* * * * *